(12) United States Patent
Gu

(10) Patent No.: US 11,175,998 B2
(45) Date of Patent: Nov. 16, 2021

(54) INFORMATION PROCESSING APPARATUS

(71) Applicant: NEC Corporation, Tokyo (JP)

(72) Inventor: Jiajun Gu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 256 days.

(21) Appl. No.: 15/868,040

(22) Filed: Jan. 11, 2018

(65) Prior Publication Data

US 2018/0253358 A1 Sep. 6, 2018

(30) Foreign Application Priority Data

Mar. 3, 2017 (JP) .............................. JP2017-039937

(51) Int. Cl.
*G06F 17/00* (2019.01)
*G06F 11/14* (2006.01)
*G06F 3/06* (2006.01)
*G06F 16/174* (2019.01)

(52) U.S. Cl.
CPC ........ *G06F 11/1464* (2013.01); *G06F 3/0608* (2013.01); *G06F 3/0641* (2013.01); *G06F 3/0644* (2013.01); *G06F 3/0673* (2013.01); *G06F 11/1448* (2013.01);
(Continued)

(58) Field of Classification Search
CPC ............ G06F 11/1464; G06F 11/1453; G06F 11/1448; G06F 3/0673; G06F 3/0641; G06F 3/0608; G06F 3/0644; G06F 3/064; G06F 16/1752; G06F 2211/104; G06F 11/1451; G06F 11/1469; G06F 21/56; G06F 21/566
See application file for complete search history.

(56) References Cited

U.S. PATENT DOCUMENTS

| 7,725,675 B2* | 5/2010 | Beniyama | ............. | G06F 3/0644 |
| | | | | 711/170 |
| 9,864,658 B1* | 1/2018 | Barcello | ................. | G06F 16/11 |
| 2005/0144172 A1 | 6/2005 | Kilian et al. | | |

(Continued)

FOREIGN PATENT DOCUMENTS

| JP | 2005-235171 A | 9/2005 |
| JP | 2009-505295 A | 2/2009 |

(Continued)

OTHER PUBLICATIONS

Nagapramod Mandagere, Pin Zhou, Mark A Smith, and Sandeep Uttamchandani, Demystifying Data Deduplication. In Proceedings of the ACM/IFIP/USENIX Middleware '08 Conference Companion (Companion '08). Association for Computing Machinery, pp. 12-17, December (Year: 2008).*

(Continued)

*Primary Examiner* — Greta L Robinson

(57) ABSTRACT

An information processing apparatus performs a backup process to store backup target data on a deduplication storage device configured to eliminate duplicate storage by referring to previously stored data having the same content. The apparatus includes a calculation unit configured to calculate the capacity after deduplication that is performed by storing the backup target data in the deduplication storage device, each time the backup process is performed, and a determination unit configured to determine whether the backup target data is normal or abnormal, based on the capacity calculated each time the backup process is performed.

13 Claims, 5 Drawing Sheets

(52) U.S. Cl.
CPC ...... *G06F 11/1453* (2013.01); *G06F 16/1752* (2019.01); *G06F 3/064* (2013.01); *G06F 2211/104* (2013.01)

(56) References Cited

U.S. PATENT DOCUMENTS

| | | | |
|---|---|---|---|
| 2009/0125577 A1 | 5/2009 | Kodama et al. | |
| 2009/0248755 A1* | 10/2009 | Watanabe | G06F 1/3209 |
| 2011/0202733 A1* | 8/2011 | Wright | G06F 16/24557 711/154 |
| 2012/0102280 A1* | 4/2012 | Nasu | G06F 11/1453 711/162 |
| 2012/0150814 A1* | 6/2012 | Vijayan Retnamma | G06F 11/1464 707/674 |
| 2012/0215743 A1* | 8/2012 | Triantafillos | G06F 11/1448 707/654 |
| 2014/0025917 A1 | 1/2014 | Kaczmarczyk et al. | |
| 2014/0136491 A1* | 5/2014 | Nemoto | G06F 3/0608 707/692 |
| 2014/0149476 A1* | 5/2014 | Kishimoto | G06F 16/1748 707/827 |
| 2015/0127855 A1* | 5/2015 | Maki | G06F 3/0611 710/5 |
| 2017/0024142 A1* | 1/2017 | Watanabe | G06F 3/06 |
| 2017/0223031 A1* | 8/2017 | Gu | H04L 63/1416 |
| 2019/0087572 A1* | 3/2019 | Ellam | G06F 21/554 |

FOREIGN PATENT DOCUMENTS

| | | |
|---|---|---|
| JP | 5124238 B2 | 1/2013 |
| JP | 2013-541055 A | 11/2013 |

OTHER PUBLICATIONS

Frederik Armknecht, Jens-Matthias Bohli, Ghassan O. Karame, and Franck Youssef, Transparent Data Deduplication in the Cloud. In Proceedings of the 22nd ACM SIGSAC Conference on Computer and Communications Security (CCS '15). Association for Computing Machinery, pp. 886-900, October (Year: 2015).*

T. Yang, D. Feng, J. Liu and Y. Wan, "FBBM: A New Backup Method with Data De-duplication Capability," 2008 International Conference on Multimedia and Ubiquitous Engineering, Busan, Korea (South), 2008, pp. 30-35, doi: 10.1109/MUE.2008.33, April (Year: 2008).*

Japanese Office Action for JP Application No. 2017-039937 dated Jan. 23, 2018 with English Translation.

* cited by examiner

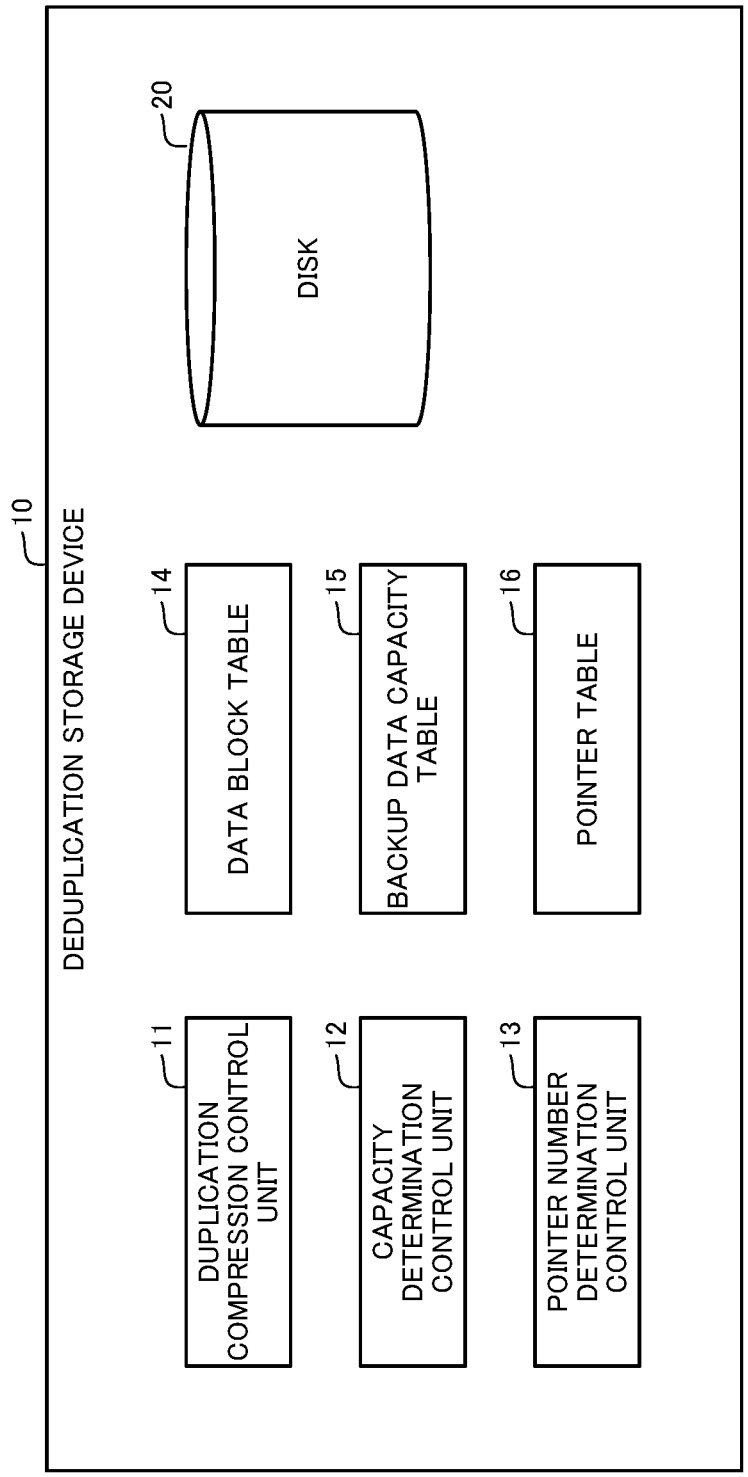

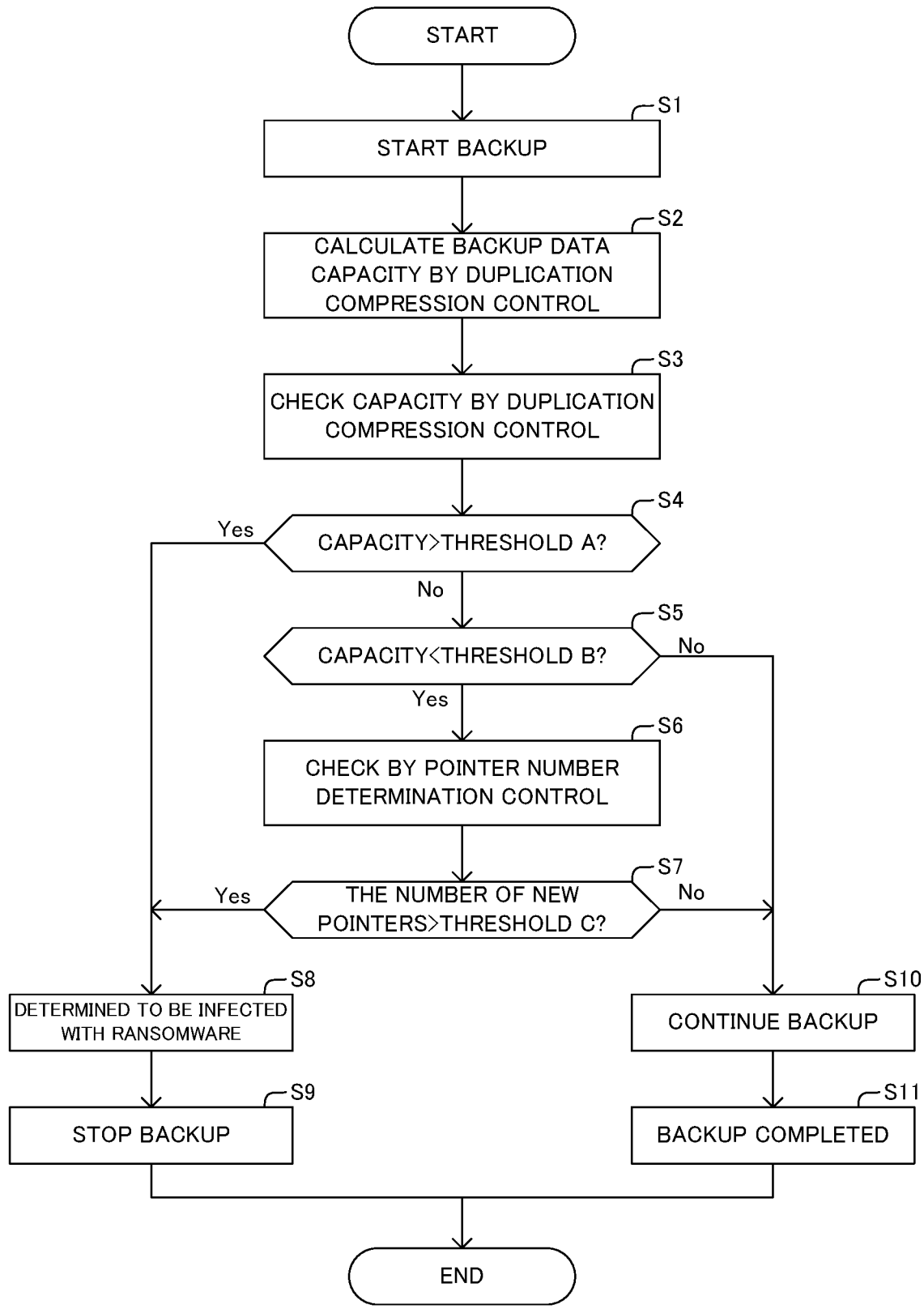

Fig.4A

| DATE | CAPACITY BEFORE DUPLICATION COMPRESSION | CAPACITY AFTER DUPLICATION COMPRESSION |
|---|---|---|
| ... | ... | ... |
| DEC. 2 | 20GB | 40MB |
| DEC. 3 | 20GB | 41MB |
| DEC. 4 | 20GB | 20GB |

Fig.4B

| DATE | CAPACITY BEFORE DUPLICATION COMPRESSION | CAPACITY AFTER DUPLICATION COMPRESSION |
|---|---|---|
| ... | ... | ... |
| DEC. 2 | 20GB | 39MB |
| DEC. 3 | 20GB | 38MB |
| DEC. 4 | 20GB | 0MB |

| DATE | THE NUMBER OF NEW POINTERS |
|---|---|
| ... | ... |
| DEC. 2 | 640 |
| DEC. 3 | 656 |
| DEC. 4 | 0 |

| DATE | THE NUMBER OF NEW POINTERS |
|---|---|
| ... | ... |
| DEC. 2 | 624 |
| DEC. 3 | 608 |
| DEC. 4 | 327,680 |

INFORMATION PROCESSING APPARATUS

INCORPORATION BY REFERENCE

The present invention is based upon and claims the benefit of priority from Japanese patent application No. 2017-039937, filed on Mar. 3, 2017, the disclosure of which is incorporated herein in its entirety by reference.

TECHNICAL FIELD

The present invention relates to an information processing apparatus, and in particular, to an information processing apparatus that controls data storage on a storage device having a duplicate storage elimination function.

BACKGROUND ART

Recently, along with development and spread of computers, various types of information are digitized. As devices for storing such digitized data, storage devices such as a magnetic tape and a magnetic disk have been known. Data to be stored is increased day by day and the amount becomes enormous, which requires a large capacity storage system. Further, reliability is also required, while the cost spent for the storage device should be reduced. In addition, it is also required that data can be easily taken out later. As a result, there is a demand for a storage system capable of automatically enhancing the storage capacity and the performance, reducing the storage cost by eliminating duplicate storage, and having high redundancy.

In consideration of such a circumstance, a content address storage system has been developed recently, as disclosed in JP 2005-235171 A (Patent Literature 1). The content address storage system distributively store the data in a plurality of storage devices, and according to a unique content address specified according to the content of the data, the storage location where the data is stored is identified. Further, there is also a content address storage system in which data is divided into a plurality of fragments, and with additional fragments serving as redundant data, the fragments are stored in a plurality of storage devices respectively.

In the content address storage systems described above, by designating a content address, it is possible to read the data, that is, fragments, stored in the storage location identified by the content address, and restore the given data before division from the fragments later.

Content address is generated based on a value uniquely generated according to the content of the data, that is, a hash value of the data, for example. As such, in the case of duplicate data, it is possible to acquire the data of the same content by referring to the data of the same storage location. Accordingly, there is no need to store duplicate data separately, whereby it is possible to eliminate duplicate record to thereby reduce the data capacity.

In particular, in the deduplication storage system as described above, data to be written, such as a file, is divided into a plurality of block data items having a predetermined capacity and compressed, and written in the storage device. In this way, by eliminating duplicate storage in block data units that are formed by dividing a file, the duplicate rate is increased, whereby the data capacity is reduced.

When the deduplication storage system as described above is used for backup, it is possible to keep backup data of a plurality of generations. Accordingly, even in the case where backup data is overwritten by encrypted improper data such as ransomware infection, for example, as the data of the most recent generation still remains, restoration can be made.

Patent Literature 1: JP 2005-235171 A
Patent Literature 2: JP 5124238 B

However, when ransomware infection is not found early, the stored data of all backup generations may be overwritten through periodical backup. Accordingly, there is a problem that the entire normal backup data may be lost.

JP 5124238 B (Patent Literature 2) describes a technology of protecting backup data. Specifically, there is a technology in which the number of each keyword appearing in the backup data is recorded, and the number of each keyword appearing in the data to be backed up is compared with the number of each keyword appearing in the backed up data, and when the difference exceeds a certain threshold, backup is not performed.

However, in the technology of Patent Literature 2, in the case of using the aforementioned deduplication storage device for backup, extraction of each keyword, calculation of the number of appearances, and maintenance are very complicated and inefficient. Accordingly, there is a problem that it is not an effective means for a deduplication storage device, and the backup data may still be lost.

Further, in not only the case of ransomware infection but also the case where data is erroneously changed or deleted, if backup is continued without knowing it, there is a problem that normal backup data will be lost.

SUMMARY

In view of the above, an exemplary object of the present invention is to solve the aforementioned problem, that is, normal backup data is lost.

An information processing apparatus, according to an exemplary aspect of the present invention, is an information processing apparatus that performs a backup process to store backup target data on a deduplication storage device configured to eliminate duplicate storage by referring to previously stored data having the same content. The apparatus includes a calculation unit configured to calculate the capacity after deduplication that is performed by storing the backup target data in the deduplication storage device, each time the backup process is performed, and a determination unit configured to determine whether the backup target data is normal or abnormal, based on the capacity calculated each time the backup process is performed.

Further, an information processing apparatus, according to an exemplary aspect of the present invention, is an information processing apparatus that performs a backup process to store backup target data on a deduplication storage device configured to eliminate duplicate storage by referring to previously stored data having the same content with use of reference data items. The apparatus includes a calculation unit configured to calculate the number of the reference data items that are generated by storing the backup target data in the deduplication storage device, each time the backup process is performed, and a determination unit configured to determine whether the backup target data is normal or abnormal based on the calculated number of reference data items.

Further, a program, according to an exemplary aspect of the present invention, is configured to cause an information processing apparatus to realize, the information processing apparatus performing a backup process to store backup target data on a deduplication storage device configured to eliminate duplicate storage by referring to previously stored data having the same content, a calculation unit configured to calculate capacity after deduplication that is performed by storing the backup target data in the deduplication storage device, each time the backup process is performed, and a determination unit configured to determine whether the backup target data is normal or abnormal, based on the capacity calculated each time the backup process is performed.

Further, a program, according to an exemplary aspect of the present invention, is configured to cause an information processing apparatus to realize, the information processing apparatus performing a backup process to store backup target data on a deduplication storage device configured to eliminate duplicate storage by referring to previously stored data having the same content with use of a reference data item, a calculation unit configured to calculate the number of the reference data items that are generated by storing the backup target data in the deduplication storage device, each time the backup process is performed, and a determination unit configured to determine whether the backup target data is normal or abnormal based on the calculated number of the reference data items.

Further, an information processing method, according to an exemplary aspect of the present invention, is an information processing method of performing a backup process to store backup target data on a deduplication storage device configured to eliminate duplicate storage by referring to previously stored data having the same content. The method includes calculating the capacity after deduplication that is performed by storing the backup target data in the deduplication storage device, each time the backup process is performed, and determining whether the backup target data is normal or abnormal, based on the capacity calculated each time the backup process is performed.

Further, an information processing method, according to an exemplary aspect of the present invention, is an information processing method of performing a backup process to store backup target data on a deduplication storage device configured to eliminate duplicate storage by referring to previously stored data having the same content with use of reference data items. The method includes calculating the number of the reference data items that are generated by storing the backup target data in the deduplication storage device, each time the backup process is performed, and determining whether the backup target data is normal or abnormal based on the calculated number of the reference data items.

With the configuration described above, the present invention is able to suppress a loss of normal data when data backup is performed on a deduplication storage device.

BRIEF DESCRIPTION OF THE DRAWINGS

FIG. 2 is a block diagram illustrating a configuration of the deduplication storage device disclosed in FIG. 1;

FIG. 3 is a flowchart illustrating an operation of the deduplication storage device disclosed in FIG. 2;

FIGS. 4A and 4B are tables illustrating exemplary data stored in the backup data capacity table disclosed in FIG. 2;

EXEMPLARY EMBODIMENTS

First Exemplary Embodiment

Figure 1:
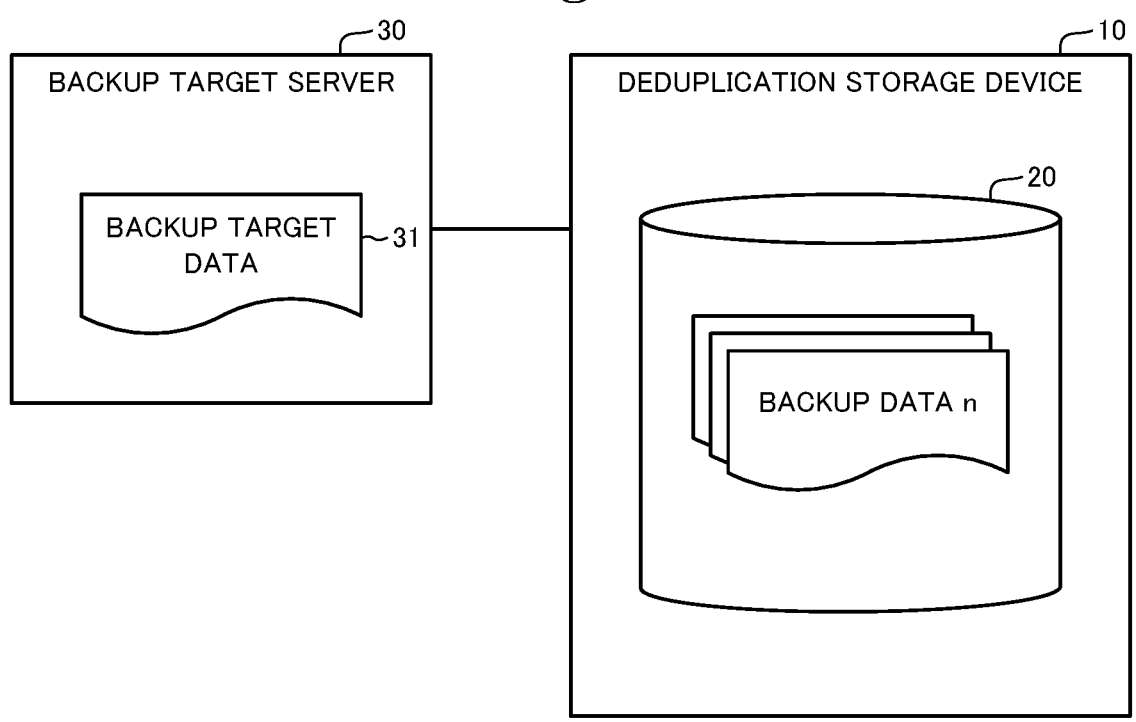
FIG. 1 is a block diagram illustrating a configuration of an information processing system according to a first exemplary embodiment of the present invention.

A first exemplary embodiment of the present invention will be described with reference to FIGS. 1 to 5B. FIGS. 1 and 2 are diagrams for explaining a configuration of an information processing system. FIGS. 3 to 5B are diagrams for explaining an operation of the information processing system.

Configuration

An information processing system of the present invention is an information processing system in which backup target data is backed up. For example, as illustrated in FIG. 1, the information processing system includes a backup target server 30 in which backup target data is stored, and a deduplication storage device 10 in which the backup target data is backed up. By performing a backup process periodically in the information processing system, multigenerational backup data is accumulated on a disk 20 in the deduplication storage device 10.

It should be noted that the information processing system may additionally include a backup server that performs a backup process of backup target data on the deduplication storage device 10. Further, the deduplication storage device 10 may be configured of a plurality of server computers that are connected to each other. For example, the deduplication storage device 10 may be configured of a plurality of accelerator nodes each of which is a server computer that controls storing and reproducing operation of the storage system itself, and a plurality of storage nodes each of which is a server computer having a storage unit for storing data.

FIG. 2 illustrates a configuration of the deduplication storage device 10. As described above, the deduplication storage device 10 is configured of one or a plurality of information processing apparatuses each having an arithmetic unit and a storage unit. As illustrated in FIG. 2, the deduplication storage device 10 includes a duplication compression control unit 11, a capacity determination control unit 12, and a pointer number determination control unit 13, which are constructed through execution of a program by the arithmetic unit. The deduplication storage device 10 also includes a data block table 14, a backup data capacity table 15, and a pointer table 16, which are formed in the storage unit. Moreover, the deduplication storage device 10 includes a disk 20 as a storage unit for storing real data of backup target data as described above.

The duplication compression control unit 11 controls read and write of backup target data. In particular, the duplication compression control unit 11 divides backup target data into a plurality of data blocks and compresses them, and writes them on the disk 20. At this time, in the case of storing data blocks having been stored on the disk 20, by generating a pointer (reference data) such as a content address that refers to such a data block, it is possible to write data blocks by eliminating duplicate storage without storing the real data blocks. It should be noted that when reading data stored on the disk 20, the duplication compression control unit 11 is able to read the target data by accessing the real data block following the reference data.

Further, when writing the backup target data, the duplication compression control unit 11 manages duplication/non-duplication of each data block, and stores information representing the storage location of each data block in the data block table 14. For example, in the data block table 14, information representing the storage location of non-duplicate data block (existing block), and information representing a reference state to the existing data of duplicate data, that is, a pointer to the existing block, are stored.

Further, when writing the backup target data, the duplication compression control unit 11 (calculation unit) calculates the capacity of the backup target data before and after the duplication compression, respectively, and stores them in the backup data capacity table 15. At that time, the duplication compression control unit 11 creates backup image data by performing duplication compression of the backup target data on the cache. Thereby, the duplication compression control unit 11 calculates the capacity after the duplication compression before actually performing the backup process.

Further, when writing the backup target data, the duplication compression control unit 11 (calculation unit) calculates the number of pointers newly generated after performing duplication compression of the backup target data, and stores it in the pointer table 16. This means that the duplication compression control unit 11 calculates the number of pointers that are newly generated because newly written data blocks of the backup target data, which are duplication of the existing data blocks, refer to the existing data blocks.

It should be noted that each time the duplication compression control unit 11 performs the backup process, the duplication compression control unit 11 stores the capacity after the duplication compression and the number of new pointers, in the respective tables 15 and 16. At that time, date and generation information are also stored in association therewith such that the backup generation can be known.

The capacity determination control unit 12 (determination unit) checks the backup data capacity table 15, and determines whether the backup target data is normal or abnormal based on the capacity after the duplication compression. Specifically, the capacity determination control unit 12 determines whether the backup target data is normal or abnormal based on a change in the capacity after the duplication compression. For example, the capacity determination control unit 12 compares the previous capacity and the current capacity, and when determining that the capacity is increased sharply on the basis of a preset criterion, the capacity determination control unit 12 determines that the backup target data is abnormal. In the present embodiment, a value that is close to the capacity before the duplication compression and smaller than the capacity before the duplication compression is set as a threshold, and when the capacity after the duplication compression is larger than the threshold, the capacity determination control unit 12 determines that the capacity is increased sharply, and determines that the backup target data is abnormal.

The pointer number determination control unit 13 (determination unit) checks the pointer table 16, and determines whether the backup target data is normal or abnormal based on the number of pointers. At that time, the pointer number determination control unit 13 determines whether the backup target data is normal or abnormal based on the capacity after the duplication compression checked by the capacity determination control unit 12 as described above, and the number of pointers. For example, when it is determined that the capacity after the duplication compression is decreased sharply on the basis of the preset criterion from the previous time to the current time, and it is determined that the number of new pointers is increased sharply on the basis of the preset reference value from the previous time to the current time, the pointer number determination control unit 13 determines that the backup target data is abnormal. In the present embodiment, when the capacity after the duplication compression takes a value close to zero, it is determined that the capacity is decreased sharply, and when the number of new pointers exceeds the threshold, it is determined that the number of pointers is increased sharply. Thereby, the pointer number determination control unit 13 determines that the backup target data is abnormal.

Here, the pointer number determination control unit 13 may determine whether the backup target data is normal or abnormal only based on the number of pointers, without checking the capacity after the duplication compression. For example, in the case where the number of new pointers is increased sharply on the basis of the preset criterion, that is, when the number of new pointers exceeds the threshold from the previous time to the current time, pointer number determination control unit 13 may determine that the backup target data is abnormal.

When it is determined that the backup target data is abnormal, the capacity determination control unit 12 and the pointer number determination control unit 13 stop the backup process. However, when it is determined that the backup target data is abnormal, a particular process at the time of abnormal determination, such as outputting of an alarm to that effect, is performed without limiting to stopping of the backup process.

Operation

Next, operation of the deduplication storage device 10 having the aforementioned configuration will be described with reference to the flowchart of FIG. 3.

First, the deduplication storage device 10 is set to periodically back up backup target data, and begins backup at the set time (step S1). The deduplication storage device 10 determines duplication compression at the time of backing up the backup target data by the duplication compression control unit 11, calculates the backup data capacity after the duplication compression, and stores it in the backup data capacity table 15 (step S2).

Then, the capacity determination control unit 12 checks the backup data capacity, and compares it with a threshold (step S3). When the capacity is larger than a threshold A (Yes at step S4), the capacity determination control unit 12 determines that the capacity is largely increased from that of the previous time. Thereby, the capacity determination control unit 12 determines that the backup target data is infected with ransomware, that is, abnormal (step S8), and stops the backup (step S9). It should be noted that the threshold A serving as a reference for determining that the capacity after the duplication compression is largely increased compared with that of the previous time may be set to a numeral close to the capacity of the backup target data before the duplication compression, or may be set by collecting the data in the backup data capacity table 15.

When the backup data capacity is smaller than a threshold B (Yes at step S5), it is determined that there is not any capacity or the capacity is decreased sharply from that of the previous time. Accordingly, the pointer number determination control unit 13 checks the number of pointers (step S6).

It should be noted that the threshold B serving as a reference for determining that there is not any capacity or the capacity is decreased sharply from that of the previous time may be set to zero or a value close to zero, or may be set by collecting the data in the backup data capacity table 15.

Checking of the backup data capacity may be performed by comparing the previous value with the current value. For example, when a value obtained by subtracting the previous value from the current value exceeds a preset threshold, it may be determined that the capacity is increased sharply from that of the previous time. On the contrary, when a value obtained by subtracting the current value from the previous value exceeds a present threshold, it may be determined that the capacity is decreased sharply from that of the previous time.

Then, the pointer number determination control unit 13 checks the number of new pointers, and compares it with a threshold C (step S7). When the number of new pointers is larger than the threshold C (Yes at step S7), the pointer number determination control unit 13 determines that the number of new pointers is increased sharply in a period from the previous time to the current time. In that case, it is determined that the backup target data is infected with ransomware, that is, abnormal (step S8), and the backup is stopped (step S9). It should be noted that the threshold C used for determining that the number of new pointers is increased sharply may be set to the total number of the data blocks constituting the backup target data before deduplication or a numeral close to the total number, or may be set by collecting the data in the data block table and the pointer table 16.

Checking of the number of new pointers may be performed by calculating the total number of pointers of the previous time and the total number of pointers of the current time, and comparing them.

When the backup data capacity takes a value between the threshold A and the threshold B at steps S4 and S5 (No at step S4, No at step S5), it is determined that the data is not infected with ransomware. In that case, the backup process is continued (step S10) to complete the backup (step S11).

Further, at steps S4 and S5, when the the number of new pointers to the existing blocks is equal to or smaller than the threshold C (No at step S7), it is determined that the data is not infected with ransomware. In that case, the backup process is continued (step S10) to complete the backup (step S11).

Next, an example will be described with reference to FIGS. 4A and 4B and 5A and 5B. It should be noted that in the below description, it is assumed that the data in the backup data capacity table 15 and the pointer table 16 are collected, and the threshold A is set to 19 GB, the threshold B is set to 1 MB, and the threshold C is set to 150,000.

Figures 5A, 5B, 6:
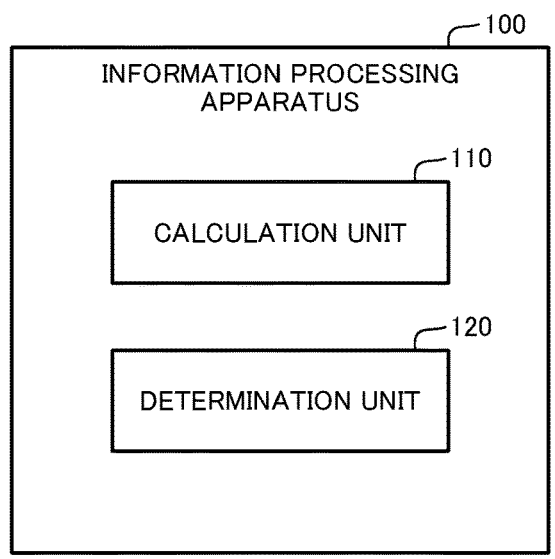
FIGS. 5A and 5B are tables illustrating exemplary data stored in the pointer table disclosed in FIG. 2.
FIG. 6 is a block diagram illustrating a configuration of an information processing apparatus according to a second exemplary embodiment of the present invention.

FIGS. 4A and 5A illustrate backup data capacity and a pointer table recorded in a backup job 1. FIGS. 4B and 5B illustrate backup data capacity and a pointer table recorded in a backup job 2.

First, on December 3, the backup job 1 is started. The duplication compression control unit 11 calculates that the capacity before duplication compression is 20 GB, the capacity after duplication compression is 41 MB, and the number of new pointers to the existing blocks is 640. Then, the duplication compression control unit 11 records these values in the backup data capacity table 15 (FIG. 4A) of the backup job 1 and in the pointer table 16 (FIG. 5A) of the backup job 1.

In the backup job 1 of December 3, the capacity of 41 MB after the duplication compression is smaller than the threshold A (19 GB) and larger than the threshold B (1 MB). Therefore, it is determined that the data is not infected with ransomware. Accordingly, the backup is continued to be completed.

Then, the backup job 2 of December 3 is started. The duplication compression control unit 11 calculates that the capacity before duplication compression is 20 GB, the capacity after duplication compression is 39 MB, and the number of new pointers to the existing blocks is 624. Then, these values are recorded in the backup data capacity table 15 (FIG. 4B) of the backup job 2 and in the pointer table 16 (FIG. 5B) of the backup job 2.

In the backup job 2 of December 3, the capacity of 39 MB after the duplication compression is smaller than the threshold A (19 GB) and larger than the threshold B (1 MB). Therefore, it is determined that the data is not infected with ransomware. Accordingly, the backup is continued to be completed.

Next, on December 4, the backup job 1 is started. The duplication compression control unit 11 calculates that the capacity before duplication compression is 20 GB, the capacity after duplication compression is 20 GB, and the number of new pointers to the existing blocks is zero. Then, these values are recorded in the backup data capacity table 15 (FIG. 4A) of the backup job 1 and in the pointer table 16 (FIG. 5A) of the the backup job 1.

In the backup job 1 of December 4, the capacity of 20 GB after the duplication compression is larger than the threshold A (19 GB). Accordingly, it is considered that the backup data is encrypted and duplication compression does not work. Therefore, it is determined that the backup target data is infected with ransomware, and the backup is stopped. In that case, by restoring the backup target data infected with ransomware of the backup job 1 to the backup data stored on December 3, it is possible to restore the data to a normal state.

Then, the backup job 2 of December 4 is started. The duplication compression control unit 11 calculates that the capacity before duplication compression is 20 GB, the capacity after duplication compression is 0 MB, and the the number of new pointers to the existing blocks is 327,680. Then, these values are recorded in the backup data capacity table 15 (FIG. 4B) of the backup job 2 and in the pointer table 16 (FIG. 5B) of the backup job 2.

In the backup job 2 of December 4, the capacity of 0 MB after the duplication compression is smaller than the threshold B (1 MB). As such, determination is made based on the number of pointers. The number of new pointers to the existing blocks is 327,680 which is larger than the threshold C (150,000). Accordingly, it is considered that the backup data is encrypted, and that different existing blocks are referred to, rather than the existing blocks referred to by the previous generation, so that the data is changed significantly. Therefore, it is determined that the backup target data is infected with ransomware, and the backup is stopped. In that case, by restoring the backup target data infected with ransomware of the backup job 2 to the backup data stored on December 3, it is possible to restore the data to a normal state.

In the above description, when the backup target data is determined to be abnormal, the backup process is stopped. However, when there is a space on the disk 20, the backup is not necessarily stopped, and may be continued. Even in that case, when the data is restored from the backup data, it is possible to restore the data to a normal state by using the past backup data determined to be normal.

As described above, according to the present invention, it is possible to determine whether or not backup target data is abnormal, that is, infected with ransomware, for example, by checking a change in the backup data capacity, from the characteristics of duplication compression storage. Accordingly, it is possible to efficiently find the abnormality in an early stage to thereby cope with it. Consequently, it is possible to suppress a loss of normal data.

Further, even in the case where data is abnormal but the backup data capacity is not changed, by only checking the number of new pointers to the existing blocks, it is possible to determine whether or not the data is abnormal, that is, infected with ransomware, for example. Accordingly, the determination accuracy can be improved.

Second Exemplary Embodiment

Next, a second exemplary embodiment of the present invention will be described with reference to FIG. 6. FIG. 6 is a block diagram illustrating a configuration of an information processing apparatus according to the second exemplary embodiment. It should be noted that the information processing apparatus of the present embodiment illustrates the outline of the configuration of the deduplication storage device described in the first exemplary embodiment.

As illustrated in FIG. 6, an information processing apparatus 100 of the present embodiment is the information processing apparatus 100 that performs a backup process to store backup target data on a deduplication storage device configured to eliminate duplicate storage by referring to previously stored data having the same content. The information processing apparatus 100 includes a calculation unit 110 configured to calculate the capacity after deduplication that is performed by storing the backup target data in the deduplication storage device, each time the backup process is performed, and a determination unit 120 configured to determine whether the backup target data is normal or abnormal, based on the capacity calculated each time the backup process is performed.

Further, the information processing apparatus 100 of the present embodiment may also be configured such that the calculation unit 110 calculates the number of reference data items generated by storing the backup target data in the deduplication storage device, each time the backup process is performed, and that the determination unit 120 determines whether the backup target data is normal or abnormal based on the calculated number of reference data items.

According to the information processing apparatus having the configuration described above, it is possible to determine whether the backup target data is abnormal, that is, infected with ransomware, for example, by only checking a change in the backup data capacity and/or a change in the number of reference data items with use of the characteristics of duplication compression storage, to thereby find it early and efficiently to cope with it. Consequently, it is possible to suppress a loss of normal data.

Supplementary Notes

The whole or part of the exemplary embodiments disclosed above can be described as, but not limited to, the following supplementary notes. Hereinafter, the outlines of the configurations of an information processing apparatus, a program, and an information processing method according to the present invention will be described. However, the present invention is not limited to the configurations described below.

Supplementary Note 1

An information processing apparatus that performs a backup process to store backup target data on a deduplication storage device, the deduplication storage device being configured to eliminate duplicate storage by referring to previously stored data having same content, the apparatus comprising:
a calculation unit configured to calculate capacity after deduplication each time the backup process is performed, the deduplication being performed by storing the backup target data in the deduplication storage device; and
a determination unit configured to determine whether the backup target data is normal or abnormal, based on the capacity calculated each time the backup process is performed.

Supplementary Note 2

The information processing apparatus according to supplementary note 1, wherein
the determination unit determines whether the backup target data is normal or abnormal, based on a change in the capacity calculated each time the backup process is performed.

Supplementary Note 3

The information processing apparatus according to supplementary note 1 or 2, wherein
the determination unit determines whether the backup target data is normal or abnormal based on the capacity calculated in the backup process performed previous time and the capacity calculated in the backup process performed current time.

Supplementary Note 4

The information processing apparatus according to supplementary note 3, wherein
the determination unit determines that the backup target data is abnormal when the determination unit determines that the capacity calculated in the backup process performed current time is increased sharply with respect to the capacity calculated in the backup process performed previous time on a basis of a preset criterion.

Supplementary Note 5

The information processing apparatus according to any of supplementary notes 1 to 4, wherein
the calculation unit calculates the number of reference data items that refer to previously stored data having same content each time the backup process is performed, the reference data items being generated by storing the backup target data in the deduplication storage device, and
the determination unit determines whether the backup target data is normal or abnormal based on the capacity and the number of the reference data items calculated each time the backup process is performed.

Supplementary Note 6

The information processing apparatus according to supplementary note 5, wherein
when the determination unit determines that the capacity calculated in the backup process performed current time is decreased sharply with respect to the capacity calculated in the backup process performed previous time on a basis of a preset criterion, the determination unit determines whether the backup target data is normal or abnormal based on the calculated number of the reference data items.

Supplementary Note 7

The information processing apparatus according to supplementary note 5 or 6, wherein
the determination unit determines whether the backup target data is normal or abnormal based on the number of newly generated reference data items.

Supplementary Note 8

The information processing apparatus according to supplementary note 7, wherein
the determination unit determines that the backup target data is abnormal when the number of the newly generated reference data items exceeds a preset threshold.

Supplementary Note 9

An information processing apparatus that performs a backup process to store backup target data on a deduplication storage device, the deduplication storage device being configured to eliminate duplicate storage by referring to previously stored data having same content with use of a reference data item, the apparatus comprising:
a calculation unit configured to calculate the number of the reference data items each time the backup process is performed, the reference data items being generated by storing the backup target data in the deduplication storage device; and
a determination unit configured to determine whether the backup target data is normal or abnormal based on the calculated number of the reference data items.

Supplementary Note 9.1

The information processing apparatus according to supplementary note 9, wherein
the determination unit determines whether the backup target data is normal or abnormal based on the number of newly generated reference data items.

Supplementary Note 9.2

The information processing apparatus according to supplementary note 9.1, wherein
the determination unit determines that the backup target data is abnormal when the number of the newly generated reference data items exceeds a preset threshold.

Supplementary Note 9.3

The information processing apparatus according to supplementary note 9, wherein
the determination unit determines whether the backup target data is normal or abnormal based on the number of the reference data items calculated in the backup process performed previous time and the number of the reference data items calculated in the backup process performed current time.

Supplementary Note 9.4

The information processing apparatus according to supplementary note 9.3, wherein
the determination unit determines that the backup target data is abnormal when the determination unit determines that the number of the reference data items calculated in the backup process performed current time is increased sharply with respect to the number of the reference data items calculated in the backup process performed previous time on a basis of a preset criterion.

Supplementary Note 10

A non-transitory computer-readable medium storing a program comprising instructions for causing an information processing apparatus to realize, the information processing apparatus performing a backup process to store backup target data on a deduplication storage device configured to eliminate duplicate storage by referring to previously stored data having same content:
a calculation unit configured to calculate capacity after deduplication each time the backup process is performed, the deduplication being performed by storing the backup target data in the deduplication storage device; and
a determination unit configured to determine whether the backup target data is normal or abnormal, based on the capacity calculated each time the backup process is performed.

Supplementary Note 10.1

The computer-readable medium storing the program according to supplementary note 10, wherein
the determination unit determines whether the backup target data is normal or abnormal, based on a change in the capacity calculated each time the backup process is performed.

Supplementary Note 10.2

The computer-readable medium storing the program according to supplementary note 10 or 10.1, wherein
the determination unit determines whether the backup target data is normal or abnormal based on the capacity calculated in the backup process performed previous time and the capacity calculated in the backup process performed current time.

Supplementary Note 10.3

The computer-readable medium storing the program according to supplementary note 10.2, wherein
the determination unit determines that the backup target data is abnormal when the determination unit determines that the capacity calculated in the backup process performed current time is increased sharply with respect to the capacity calculated in the backup process performed previous time on a basis of a preset criterion.

Supplementary Note 10.4

The computer-readable medium storing the program according to any of supplementary notes 10 to 10.3, wherein
the calculation unit calculates the number of reference data items that refer to previously stored data having same content each time the backup process is performed, the reference data items being generated by storing the backup target data in the deduplication storage device, and
the determination unit determines whether the backup target data is normal or abnormal based on the capacity and the number of the reference data items calculated each time the backup process is performed.

Supplementary Note 10.5

The computer-readable medium storing the program according to supplementary note 10.4, wherein
when the determination unit determines that the capacity calculated in the backup process performed current time is decreased sharply with respect to the capacity calculated in the backup process performed previous time on a basis of a preset criterion, the determination unit determines whether the backup target data is normal or abnormal based on the calculated number of the reference data items.

Supplementary Note 10.6

The computer-readable medium storing the program according to supplementary note 10.4 or 10.5, wherein
the determination unit determines that the backup target data is abnormal when the number of the newly generated reference data items exceeds a preset threshold.

Supplementary Note 10.7

A non-transitory computer-readable medium storing a program comprising instructions for causing an information processing apparatus to realize, the information processing apparatus performing a backup process to store backup target data on a deduplication storage device configured to eliminate duplicate storage by referring to previously stored data having same content with use of a reference data item:
a calculation unit configured to calculate the number of the reference data items each time the backup process is performed, the reference data items being generated by storing the backup target data in the deduplication storage device; and
a determination unit configured to determine whether the backup target data is normal or abnormal based on the calculated number of the reference data items.

Supplementary Note 10.8

The computer-readable medium storing the program according to supplementary note 10.7, wherein
the determination unit determines whether the backup target data is normal or abnormal based on the number of newly generated reference data items.

Supplementary Note 10.9

The computer-readable medium storing the program according to supplementary note 10.8, wherein
the determination unit determines that the backup target data is abnormal when the number of the newly generated reference data items exceeds a preset threshold.

Supplementary Note 10.10

The computer-readable medium storing the program according to supplementary note 10.7, wherein
the determination unit determines whether the backup target data is normal or abnormal based on the number of the reference data items calculated in the backup process performed previous time and the number of the reference data items calculated in the backup process performed current time.

Supplementary Note 10.11

The computer-readable medium storing the program according to supplementary note 10.10, wherein
the determination unit determines that the backup target data is abnormal when the determination unit determines that the number of the reference data items calculated in the backup process performed current time is increased sharply with respect to the number of the reference data items calculated in the backup process performed previous time on a basis of a preset criterion.

Supplementary Note 11

An information processing method of performing a backup process to store backup target data on a deduplication storage device, the deduplication storage device being configured to eliminate duplicate storage by referring to previously stored data having same content, the method comprising:
calculating capacity after deduplication each time the backup process is performed, the deduplication being performed by storing the backup target data in the deduplication storage device; and
determining whether the backup target data is normal or abnormal, based on the capacity calculated each time the backup process is performed.

Supplementary Note 12

The information processing method according to supplementary note 11, further comprising
determining the backup target data is normal or abnormal, based on a change in the capacity calculated each time the backup process is performed.

Supplementary Note 12.1

The information processing method according to supplementary note 11 or 12, further comprising
determining whether the backup target data is normal or abnormal, based on the capacity calculated in the backup process performed previous time and the capacity calculated in the backup process performed current time.

Supplementary Note 12.2

The information processing method according to supplementary note 12.1, further comprising
determining that the backup target data is abnormal when it is determined that the capacity calculated in the backup process performed current time is increased sharply with respect to the capacity calculated in the backup process performed previous time on a basis of a preset criterion.

Supplementary Note 13

The information processing method according to supplementary note 11 to 12.2, further comprising
calculating the number of reference data items that refer to previously stored data having same content, along with the capacity, each time the backup process is performed, the reference data items being generated by storing the backup target data in the deduplication storage device, and determining whether the backup target data is normal or abnormal based on the capacity and the number of the reference data items calculated each time the backup process is performed.

Supplementary Note 13.1

The information processing method according to supplementary note 13, further comprising
when it is determined that the capacity calculated in the backup process performed current time is decreased sharply with respect to the capacity calculated in the backup process performed previous time on a basis of a preset criterion, determining whether the backup target data is normal or abnormal based on the calculated number of the reference data items.

Supplementary Note 13.2

The information processing method according to supplementary note 13 or 13.1, further comprising
determining whether the backup target data is normal or abnormal based on the number of newly generated reference data items.

Supplementary Note 13.3

The information processing method according to supplementary note 13.2, further comprising
determining that the backup target data is abnormal when the number of the newly generated reference data items exceeds a preset threshold.

Supplementary Note 14

An information processing method of performing a backup process to store backup target data on a deduplication storage device, the deduplication storage device being configured to eliminate duplicate storage by referring to previously stored data having same content with use of a reference data item, the method comprising:
calculating the number of the reference data items each time the backup process is performed, the reference data items being generated by storing the backup target data in the deduplication storage device; and
determining whether the backup target data is normal or abnormal based on the calculated number of the reference data items.

Supplementary Note 14.1

The information processing method according to supplementary note 14, further comprising
determining whether the backup target data is normal or abnormal based on the number of newly generated reference data items.

Supplementary Note 14.2

The information processing method according to supplementary note 14.1, further comprising
determining that the backup target data is abnormal when the number of the newly generated reference data items exceeds a preset threshold.

Supplementary Note 14.3

The information processing method according to supplementary note 14, further comprising
determining whether the backup target data is normal or abnormal based on the number of the reference data items calculated in the backup process performed previous time and the number of the reference data items calculated in the backup process performed current time.

Supplementary Note 14.4

The information processing method according to supplementary note 14.3, further comprising
determining that the backup target data is abnormal when the determination unit determines that the number of the reference data items calculated in the backup process performed current time is increased sharply with respect to the number of the reference data items calculated in the backup process performed previous time on a basis of a preset criterion.

It should be noted that the program described above may be stored in a storage device or recorded on a computer-readable storage medium. The storage medium is a portable medium such as a flexible disk, an optical disk, a magneto-optical disk, a semiconductor memory, or the like.

While the present invention has been described with reference to the exemplary embodiments described above, the present invention is not limited to the above-described embodiments. The form and details of the present invention can be changed within the scope of the present invention in various manners that can be understood by those skilled in the art.

REFERENCE SIGNS LIST 10 deduplication storage device
11 duplication compression control unit
12 capacity determination control unit
13 pointer number determination control unit
14 data block table
15 backup data capacity table
16 pointer table
20 disk
30 backup target server
31 backup target data
100 information processing apparatus
110 calculation unit
120 determination unit

The invention claimed is:

1. An information processing apparatus that performs a backup process to store backup target data on a deduplication storage device, the deduplication storage device being configured to eliminate duplicate storage by referring to previously stored data having same content, the apparatus comprising:
a calculation unit configured to calculate capacity after deduplication each time the backup process is performed, the deduplication being performed by storing the backup target data in the deduplication storage device; and
a determination unit configured to determine whether the backup target data is normal or abnormal, based on the capacity calculated each time the backup process is performed, wherein
the calculation unit calculates the number of reference data items that refer to previously stored data having same content each time the backup process is performed, the reference data items being generated by storing the backup target data in the deduplication storage device, and the determination unit determines whether the backup target data is normal or abnormal based on the capacity that is calculated each time the backup process is performed and the number of newly generated reference data items that are generated each time the backup process is performed, and the determination unit determines that the backup target data is abnormal when the capacity calculated in the backup process performed current time is decreased sharply with respect to the capacity calculated in the backup process performed previous time on a basis of a preset criterion, and when the number of the newly generated reference data items exceeds a preset threshold.

2. The information processing apparatus according to claim 1, wherein
the determination unit determines whether the backup target data is normal or abnormal, based on a change in the capacity calculated each time the backup process is performed.

3. The information processing apparatus according to claim 1, wherein
the determination unit determines that the backup target data is abnormal when the determination unit determines that the capacity calculated in the backup process performed current time is increased sharply with respect to the capacity calculated in the backup process performed previous time on a basis of a preset criterion.

4. An information processing apparatus that performs a backup process to store backup target data on a deduplication storage device, the deduplication storage device being configured to eliminate duplicate storage by referring to previously stored data having same content with use of a reference data item, the apparatus comprising:
a calculation unit configured to calculate the number of the reference data items each time the backup process is performed, the reference data items being generated by storing the backup target data in the deduplication storage device; and
a determination unit configured to determine whether the backup target data is normal or abnormal based on the calculated number of the reference data items, wherein
the calculation unit calculates the number of reference data items that refer to previously stored data having same content each time the backup process is performed, the reference data items being generated by storing the backup target data in the deduplication storage device, and
the determination unit determines whether the backup target data is normal or abnormal based on the capacity that is calculated each time the backup process is performed and the number of newly generated reference data items that are generated each time the backup process is performed, and the determination unit determines that the backup target data is abnormal when the capacity calculated in the backup process performed current time is decreased sharply with respect to the capacity calculated in the backup process performed previous time on a basis of a preset criterion, and when the number of the newly generated reference data items exceeds a preset threshold.

5. The information processing apparatus according to claim 4, wherein
the determination unit determines whether the backup target data is normal or abnormal based on the number of newly generated reference data items.

6. The information processing apparatus according to claim 5, wherein
the determination unit determines that the backup target data is abnormal when the number of the newly generated reference data items exceeds a preset threshold.

7. The information processing apparatus according to claim 4, wherein
the determination unit determines that the backup target data is abnormal when the determination unit determines that the number of the reference data items calculated in the backup process performed current time is increased sharply with respect to the number of the reference data items calculated in the backup process performed previous time on a basis of a preset criterion.

8. An information processing method of performing a backup process to store backup target data on a deduplication storage device, the deduplication storage device being configured to eliminate duplicate storage by referring to previously stored data having same content, the method comprising:
calculating capacity after deduplication each time the backup process is performed, the deduplication being performed by storing the backup target data in the deduplication storage device;
determining whether the backup target data is normal or abnormal, based on the capacity calculated each time the backup process is performed; and
calculating the number of reference data items that refer to previously stored data having same content each time the backup process is performed, the reference data items being generated by storing the backup target data in the deduplication storage device, wherein
whether the backup target data is normal or abnormal is determined based on the capacity that is calculated each time the backup process is performed and the number of newly generated reference data items that are generated each time the backup process is performed, and the the backup target data is determined as abnormal when the capacity calculated in the backup process performed current time is decreased sharply with respect to the capacity calculated in the backup process performed previous time on a basis of a preset criterion, and when the number of the newly generated reference data items exceeds a preset threshold.

9. The information processing method according to claim 8, further comprising
determining the backup target data is normal or abnormal, based on a change in the capacity calculated each time the backup process is performed.

10. The information processing method according to claim 8, further comprising
determining that the backup target data is abnormal when it is determined that the capacity calculated in the backup process performed current time is increased sharply with respect to the capacity calculated in the backup process performed previous time on a basis of a preset criterion.

11. The information processing method according to claim 8, further comprising
calculating the number of reference data items that refer to previously stored data having same content, along with the capacity, each time the backup process is performed, the reference data items being generated by storing the backup target data in the deduplication storage device, and determining whether the backup target data is normal or abnormal based on the capacity and the number of the reference data items calculated each time the backup process is performed.

12. The information processing method according to claim 11, further comprising when it is determined that the capacity calculated in the backup process performed current time is decreased sharply with respect to the capacity calculated in the backup process performed previous time on a basis of a preset criterion, determining whether the backup target data is normal or abnormal based on the calculated number of the reference data items.

13. The information processing method according to claim 11, further comprising determining whether the backup target data is normal or abnormal based on the number of newly generated reference data items.

\* \* \* \* \*